Nov. 14, 1950  C. E. WHITTLE  2,529,752
METHOD AND APPARATUS FOR LOADING AND TRANSPORTING
LOGS AND OTHER MATERIALS
Filed May 14, 1948  5 Sheets-Sheet 3
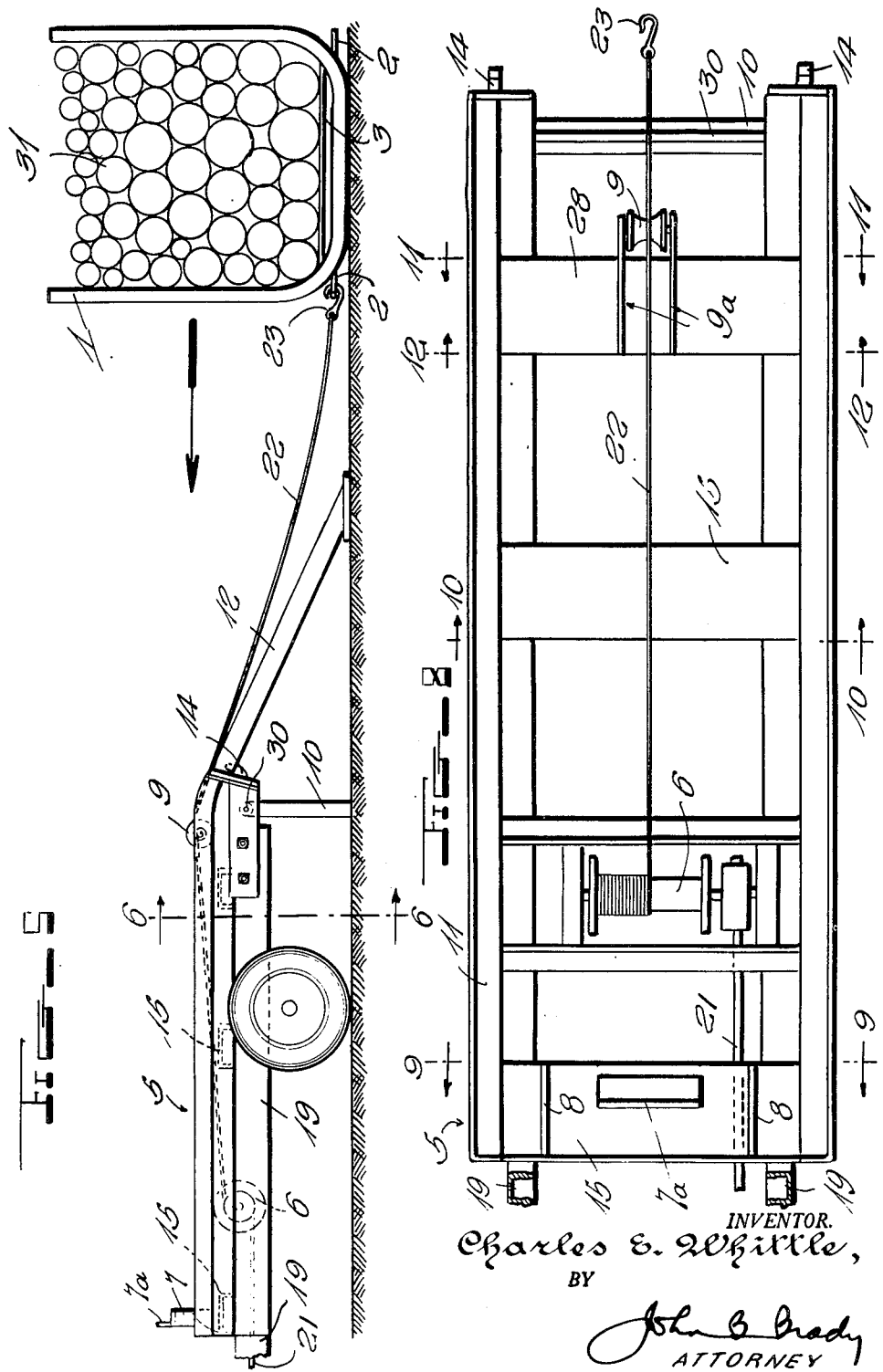
INVENTOR.
Charles E. Whittle,
BY
John B. Brady
ATTORNEY

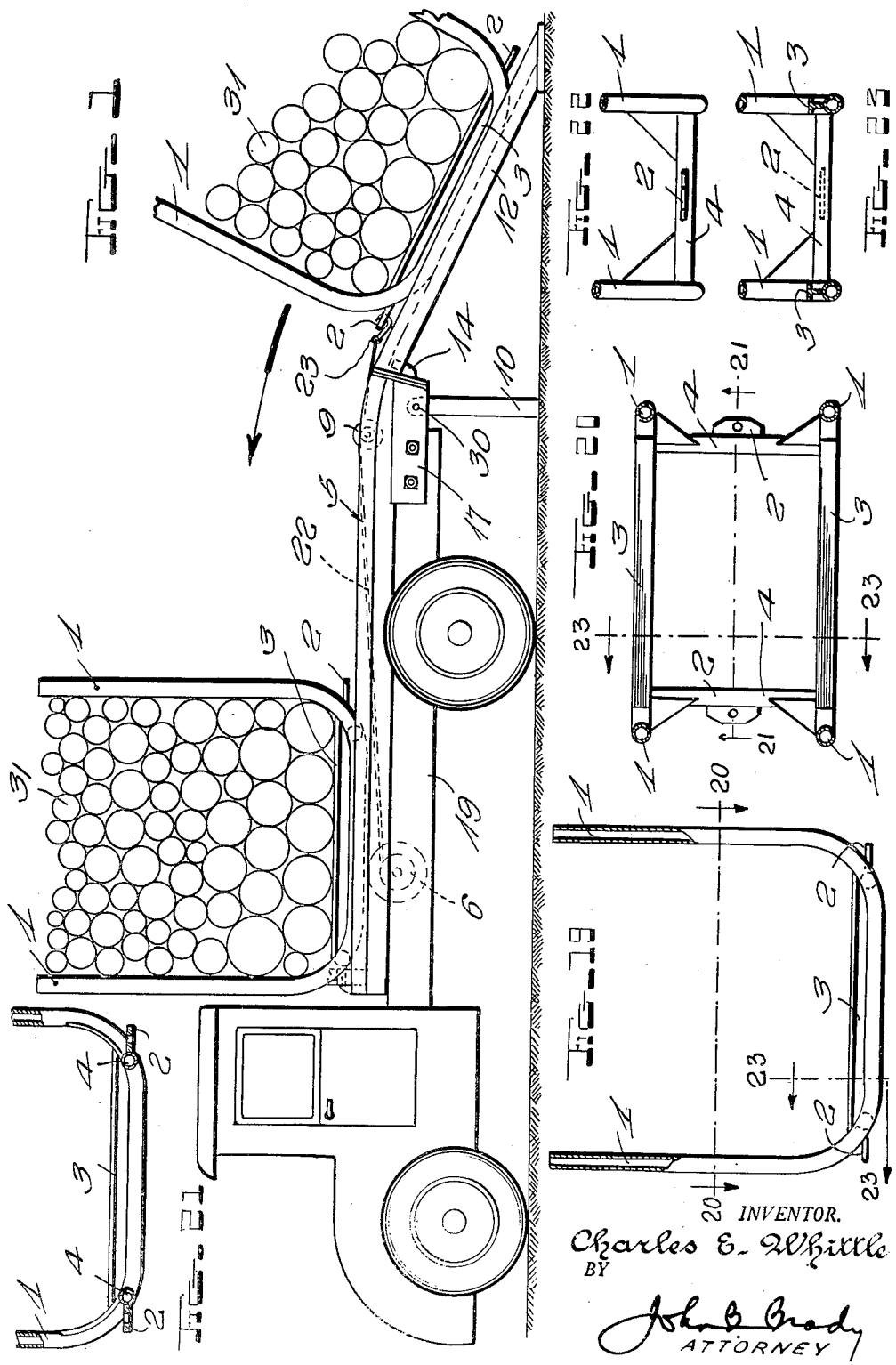

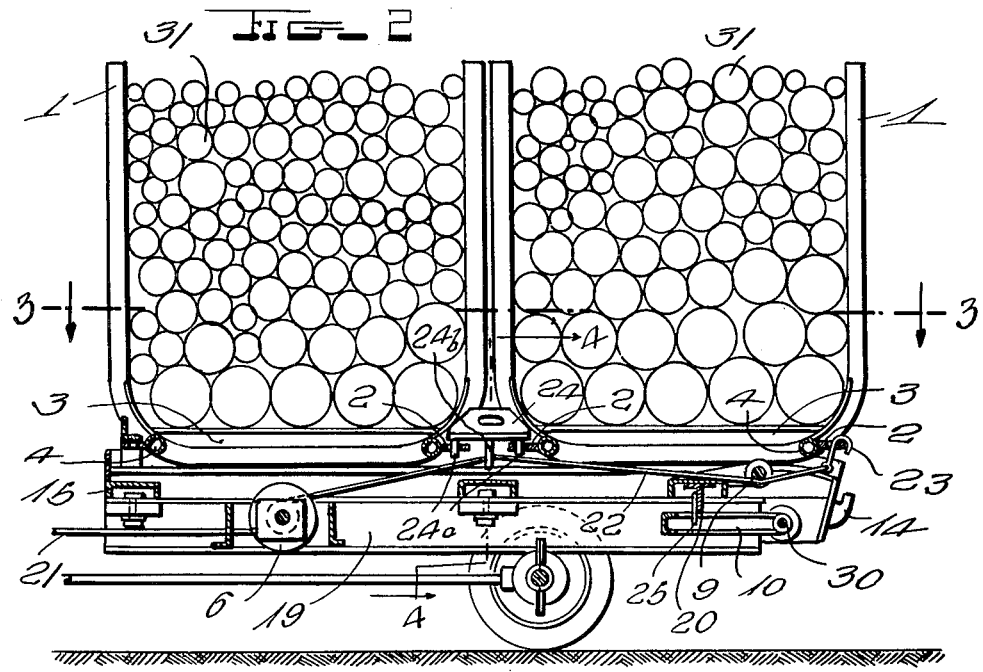
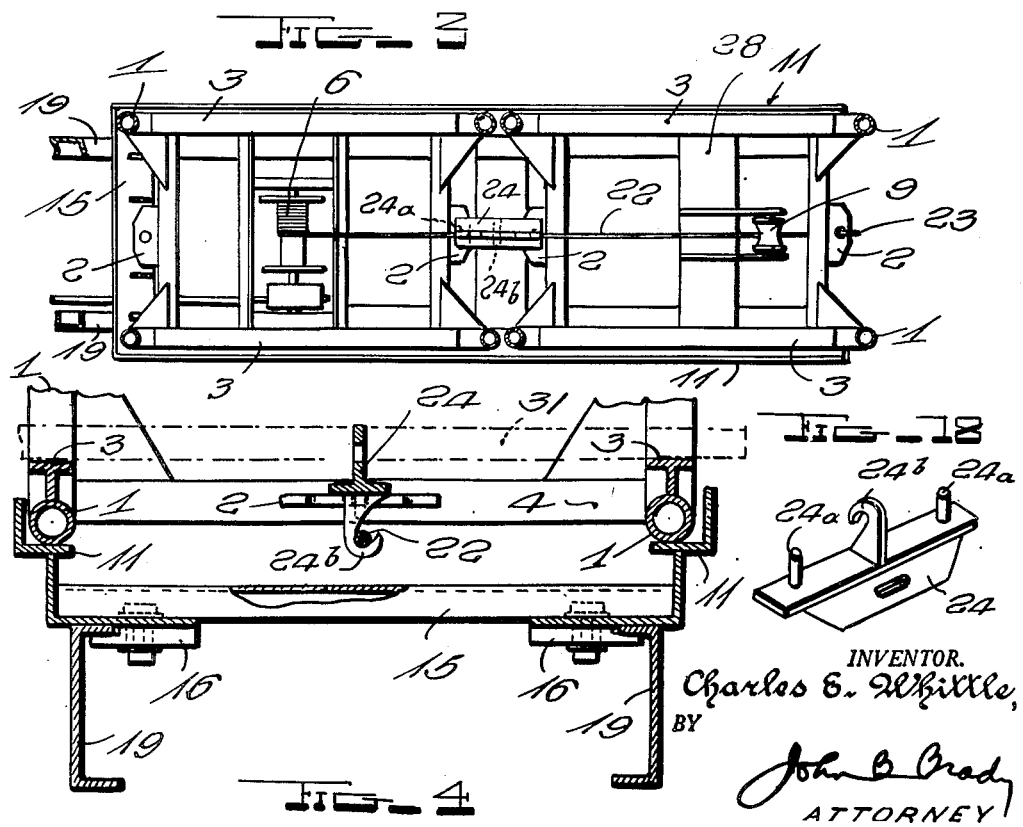

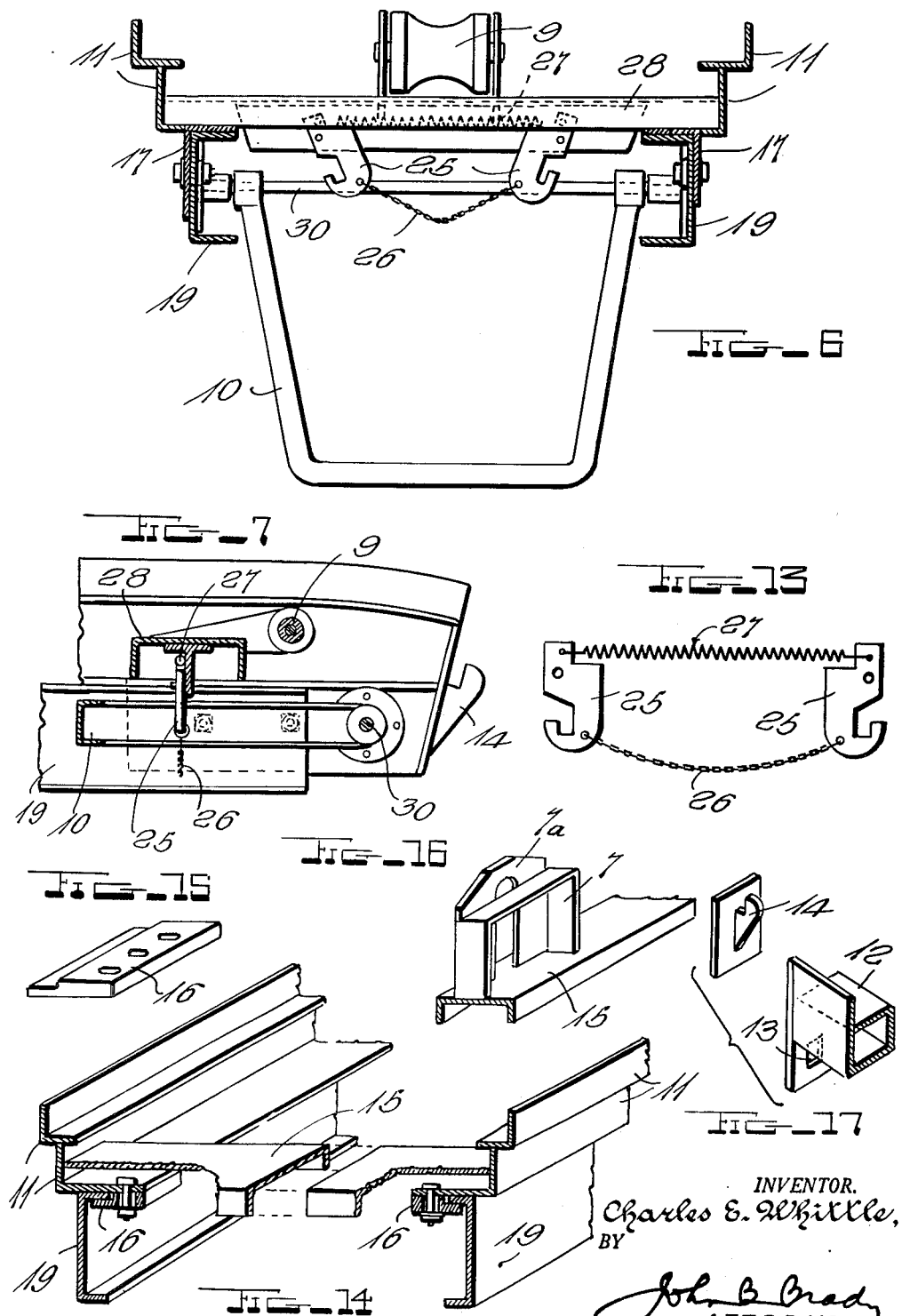

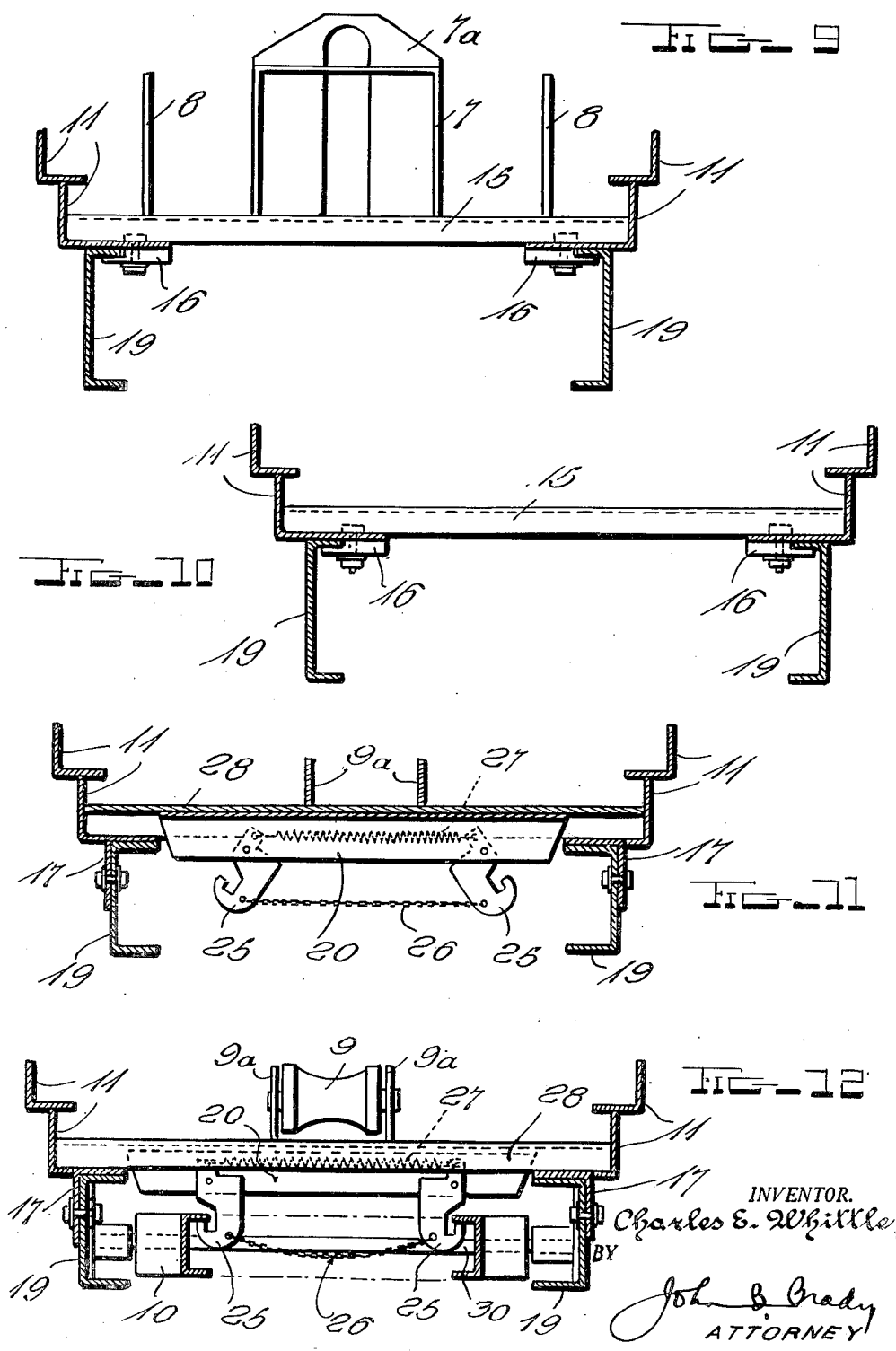

Patented Nov. 14, 1950

2,529,752

UNITED STATES PATENT OFFICE 2,529,752

METHOD AND APPARATUS FOR LOADING AND TRANSPORTING LOGS AND OTHER MATERIALS

Charles E. Whittle, Brunswick, Ga.

Application May 14, 1948, Serial No. 27,105

8 Claims. (Cl. 214—85)

My invention relates broadly to a method and apparatus for loading and transporting logs and other materials and more particularly to a method and apparatus for handling heavy logs for transportation by truck or other transportation units.

One of the objects of my invention is to provide an improved method and apparatus for handling heavy bulk material and in loading and transporting the same on trucks or other transportation units.

Another object of my invention is to provide an improved construction of self-contained package for loading bulk material on trucks or other transportation units.

A further object of my invention is to provide an arrangement of skid ramps for association with a special truck body or other transportation unit for facilitating loading and unloading of heavy materials.

Still another object of my invention is to provide an arrangement of hingedly mounted reinforcing support for truck bodies or other transportation units which may be moved into position for bracing the truck body or other transportation unit during loading and unloading operations.

Still another object of my invention is to provide an arrangement of winch and cable mechanism operative during loading operations for moving heavy loads into position on a truck body or other transportation unit and operative during transportation for maintaining the load in position on the truck body or other transportation unit.

Other and further objects of my invention reside in the construction of pallets and associated mechanism carried by a truck body or other transportation unit for loading and unloading one or more pallets on the truck body or other transportation unit and maintaining the pallets in position during transportation as set forth more fully in the specification hereinafter following by reference to the accompanying drawings, in which—

Figure 1 is a side elevational view of a truck having a special truck body and shown in position for loading pallets in position on the truck body, preparatory to transporation; Fig. 2 is a vertical sectional view of a fragmentary portion of a truck completely loaded with two pallets thereon arranged in accordance with my invention; Fig. 3 is a horizontal sectional view taken substantially on line 3—3 of Fig. 2 with the load omitted from the pallets in order to clarify the arrangement of the pallets on the truck; Fig. 4 is a fragmentary transverse sectional view, on an enlarged scale, taken substantially on line 4—4 of Fig. 2 with the load carried by one of the pallets indicated by dotted lines; Fig. 5 is a diagrammatic view showing a loaded pallet about to be loaded onto the truck body; Fig. 6 is an enlarged transverse sectional view taken substantially on line 6—6 of Fig. 5 illustrating the supporting leg structure load to reinforcing operative position beneath the truck body according to my invention; Fig. 7 is a fragmentary longitudinal sectional view through the supporting leg structure at the rear of the truck and illustrating the supporting leg structure moved to stored position during transportation; Fig. 8 is an enlarged top plan view of the special truck body showing the winch and cable system employed for loading the pallets onto the truck body and for maintaining the loaded pallets in position during transportation; Fig. 9 is a transverse sectional view taken substantially on line 9—9 of Fig. 8, looking in the direction of the arrows; Fig. 10 is a transverse sectional view taken substantially on line 10—10 of Fig. 8, looking in the direction of the arrows; Fig. 11 is a transverse sectional view taken substantially on line 11—11 of Fig. 8 looking in the direction of the arrows and showing the loading foot latch in the position which the latch assumes after release of the supporting foot structure; Fig. 12 is a transverse sectional view taken substantially on line 12—12 of Fig. 8 looking in the direction of the arrows and showing the loading foot latch in a position engaging the supporting foot structure; Fig. 13 is a view of the loading foot latch for maintaining the supporting foot in elevated position; Fig. 14 is a fragmentary perspective view of the truck body showing the manner of clamping the transverse structural members in selected positions with respect to the truck chassis; Fig. 15 is a perspective view of one of the adjustable clamps employed in adjusting the transverse structural members with respect to the truck chassis; Fig. 16 is a fragmentary perspective view of the front end load abutment means and binder chain securing means; Fig. 17 is a perspective view of the connection means for the hook connection means for the skid ramps in assembled relation to the truck body; Fig. 18 is a perspective view of the hold-down bracket for the loaded pallets; Fig. 19 is a side elevational view with parts broken away and illustrated in section showing the pallet used for loading logs or other material in a readily transportable package on the truck body; Fig. 20 is a transverse sectional view taken substantially on line 20—20 of Fig. 19; Fig. 21 is a fragmentary longitudinal sectional view taken substantially on line 21—21 of Fig. 20; Fig. 22 is a fragmentary end view of the pallet illustrated in Figs. 19–21; and Fig. 23 is a transverse sectional view taken substantially on line 23—23 of Fig. 20.

The advantages of the improved method of loading pulp-wood for transport to some delivery point are readily appreciated when compared with the conventional methods.

*Conventional method.*—Pulpwood production is a task requiring much physical labor. Trees are felled with hand or power saws, bucked or blocked into desired length (in the Southeastern section of the United States, usually 5 to 8 feet long) and stacked in "ricks." Sometimes this ricking is done generally throughout a timber stand and sometimes by concentrating tree length logs at a central point (skidding with tractors, mules or oxen to a log deck), and thereby bucking to desired lengths and ricked or stacked. Under either of the above methods each block of wood is manually handled two or three times:

(a) The first physical handling is the lifting by manual labor of each block and placing it in a rick or stack.

(b) The second manual handling is taking each stick from the rick upon arrival of the truck in the woods and placing the sticks on the truck bed.

(c) The third physical handling is required for about one-half of each truck load in that labor must stand on the truck bed, load, or on tires and restack about one-half the load to obtain the desired load height.

The above and accepted method of pulpwood production has many disadvantages; two principal ones are:

(a) Enormous physical effort to handle material, (two and one-half average handlings).

(b) Idle truck time in woods while being loaded, (average forty-five minutes to one-hour per load).

*Improved method.*—Assume an average one or two truck logger (the type used for producing 75% of the southern pulpwood). I replace the conventional pulpwood truck rack with the improved body structure of my invention, and a set of ramps. I usually employ three sets of pallets. The pallets are placed empty in the area to be logged, end-to-end, and spaced five to ten feet apart. The trees are felled with hand or power saws, limbed, topped and skidded with a tractor, mules or oxen, alongside and parallel to the pallets. Here the long logs are blocked into desired lengths and up-ended and loaded directly into the pallets. The pallet bed is seven inches above the ground and the top of the load approximately six feet from the ground. While cutting and loading is being done on one side of a line of pallets, long logs are skidded into similar position on the opposite side of the line of pallets. Men cutting blocks and loading pallets in this manner are always clear of m_n skidding timber. Some of the advantages using my improved method are:

(a) Each stick of pulpwood is lifted only one time by manual labor.

(b) Approximately one-half of such wood is up-ended into pallets, requiring little lifting effort.

(c) Low loading height.

(d) Trucks are delayed only a few minutes in skidding or positioning pallets on the truck body (average seven minutes to self-load and leave).

(e) Predetermined loads for truck.

While there are other ways to mechanically handle pulpwood my improved loading equipment and method made possible by such equipment meets the requirements of those persons producing the bulk of southern pulpwood:

(a) The equipment is simple and requires little maintenance.

(b) It increases production, (per man hour an average of 50%).

(c) Two trucks will do the work of three.

(d) It works equally well under a selective timber removal, a light cut per acre, or for large concentrated volumes.

The loading and transporting system of my invention comprises the following principal parts:

(1) A body structure furnished in any desired length for various wheel base trucks 5—Fig. 8.

(2) One set of two skid ramps 12—Figs. 1, 5, 17.

(3) Pallets 1—Figs. 1–5, 17, 19–23.

The body structure is a complete unit made up of the following parts:

Cross members shown in Figs. 3, 8–12 welded to and supporting side rail members 11 and secured to truck chassis 19 with chassis clamps 16 and with rear body angles 17 bolted to the chassis; angles 17 and clamps 16 are parts of the body and supplied in various dimensions to match the chassis widths of trucks of various manufacture. Part 6 is a worm driven winch mounted in cross rails which are a part of body assembly. The rails are flanged on each end where they engage body side members 19 and side rails 11 at these four points of contact are boxed, permitting the bolting of winch supporting angles so that they can be lifted out when it is required to remove the winch for service. It is necessary that the winch be mounted in this low position for reasons mentioned hereinafter.

The method of fastening the body assembly to the truck chassis members 19 is very important.

(a) It is bolted only at the rear through holes in the chassis members 19 provided by the truck manufacturer.

(b) Clamps 16 are easily adjustable in width for any dimension truck chassis and while providing a positive method of attachment of the body 5 to the chassis 19, allows a breathing action between the chassis and the body; U-bolts stretch and bolting of the body 5 to chassis 19 at more than one section will shear bolts or damage the chassis.

(c) The clamps 16 give no trouble and provide simple rapid installation or removal of the body.

Supporting leg 10 is mounted and swings angularly on shaft 30 supported by rear body angles 17 from the stored position shown in Figs. 2, 7 and 12, to the erected supporting position shown in Figs. 1, 5 and 6.

Various body parts are more fully described as follows:

In Fig. 9, parts 8 are stops for the pallet cross bar 4. Part 7 is shaped to house pull-tab 2 on the forward pallet while tab 2 slides under and within the housing formed by part 7; 7a, a part of 7, provides an opening in which to fasten the log binder chain to pass over the load in those States where the laws or regulations so require, or where the operator desires.

Fig. 10 is a typical transverse section along the body structure. One or more such sections are provided, depending upon body length.

Fig. 11 shows part 11 comprising the longitudinally extending side rail assemblies welded to all cross members with the exception of the winch supporting rails. Part 17 comprising the body rear angles are welded to the body 5 for specified truck chassis 19 width.

Fig. 12, part 28 illustrates the reinforced construction of the sections at 11—11 and 12—12 to better support roller 9 and to provide mounting for loading foot latches 25. Fig. 12 in combination with Figs. 1, 2 and 5 make it clear that loading foot 10 mounts to the rear of cross section 11—11 (Fig. 11). However, the spring loaded latch 25 is mounted on strong back 20 shown in Figs. 11 and 12. Fig. 12 shows clearly how latch 25 holds foot 10 in transport position.

Fig. 13 shows the loading foot latch 25 with spring 27 above the hinge points of latch 25, between upwardly extending projections thereon, to insure positive engagement of latch 25 with foot 10. Latches 25 are shaped for automatic lock when foot 10 is raised forward. By pulling chain 26 to overcome spring action 27 both latches disengage and foot 10 swings free in vertical or loading position.

The winch 6 is driven through shaft 21 by a power take-off mounted on the truck transmission and operated by a control lever mounted in the cab of the truck.

The pallet construction comprises one of the important features of my invention. The pallet is illustrated in plan in Fig. 20 at 1, and shown in elevation loaded with logs 31 in transport position on truck in Fig. 2. The pallet 1 is of reinforced tubular construction and designed to carry pulpwood or other timber products cut in lengths not to exceed highway limits. The pallets are made in different lengths and may be used in various multiples, depending upon body length and bulk and weight of the load. The pallet is actually a body that may be constructed with a floor and/or fully or partially enclosed sides for the loading and transportation of material. Two U-shaped end frames are provided and interconnected adjacent their bases and constituting an open-work frame. A T rail 3 is set within the base of each U-shaped end frame and provides a rigid support for the heavy load constituted by the logs or other material.

The ramps are shown at 12 in Figs. 1, 5 and 17 and comprise two identical members, part 12, Fig. 1, shown in elevation with the detail of slotted plate 13; the female connection a part of the ramp, and hook 14 the male connection, shown in persepctive in Fig. 17. Referring to Fig. 1 the angle at which hook 14 is set when fabricated as a part of body 5 eliminates the tendency for ramp 12, carrying female part 13, to raise off hook 14. The ramps may be slid under pallets and carried with the truck, but are usually left at loading point.

Fig. 5 shows the body assembly, part 5, illustrated in plan view. Fig. 8 showing a complete assembly as it is furnished to mount on the chassis 19. Fig. 5 shows particularly the cable 22 passing over roller 9 which is its loading position with respect to the roller.

Fig. 2 shows how a multiplicity of pallets are securely fastened to the body structure 5 for transport, loaded or empty. Referring again to Fig. 20, the forward tab 2 extends beneath the frame 7 shown in Fig. 10. When the first pallet, or single pallet, is loaded, hook 23 is engaged with tab 2 and the pallet is winched up ramp 12 and forward on body 5 above rails 11, but not as far forward as the winch 6 location; hook 23 is then removed from forward tab 2 and passed under pallet 1, caught on rear tab 2 of the pallet as shown in Fig. 2, and the pallet winched forward until the pallet cross bar 4 strikes body stops 8. The forward tab 2 passes under the top section of the housing 7 which automatically locks it to the body.

If two or more pallets constitute a load, a center hold-down or fastening device is required at each intersection; that is, removable center hold-down bracket 24, shown in Fig. 18. After the pallets are positioned on the body 5, the operator reaches between pallets, in area provided by pallet lower radii, and drops bracket 24 in place. Pins 24a drop in opposing pallet tabs 2 as shown in Fig. 2. Cable 22 is set in bracket hook 24b; cable hook 23 is passed under roller 9 and engaged with rear tab 2 of the rear pallet. Worm drive winch tightens cable 22 which locks the pallets to body 5.

This method of securing pallets works very efficiently. It is simple, foolproof and rapid. If only one pallet is used, that is, if the removable pallet 1 were as long as body parts 5, only the front lock, that is the tab 2 under housing 7 and the rear lock, that is the cable under roller 9 to rear tab 2 would be used. If three pallets are used, two center clamps 24 are required.

Pallet 1 with respect to its superstructure is designed particularly to accommodate logs, blocks or similar products. However, modified body sections may be applied to pallet 1 and other types of superstructure can be furnished depending upon the material to be transported. One example is the farmer who wishes to use his truck seasonably or interchangeably for the production of cross ties, veneer blocks, or pulpwood, and for general farm use. A pallet having a body part with fixed or removable sides and floored, or a floored platform with no sides, may be furnished the length of body 5. It may be fabricated on a male skid base section and with tabs 2 on either end. The farmer thus has a logging truck used with pallets, as illustrated in Fig. 20, and a farm truck used with a platform body as described to haul produce, fertilizer, etc. The platform or general utility body is positioned on truck body 5, empty or loaded, and locked in place in a matter of minutes, and removed in a like time.

The fact that pallets 1 may be furnished to small landowners, in a given area, who may possess wooded acreage, but not transportation facilities, permits the use of the pallets 1 in a highly unique merchandizing plan. The pallets 1 are loaded with logs by the small landowner and left in a position adjacent the highway to be picked up by a truck which may be operated by a delivery company, the truck being constructed in accordance with the disclosure of this invention. The truck is engaged simply in the collection and delivery of the logs and thus a loading and delivery service may be rendered to a large number of small landowners who may cut timber and load the timber into pallets, but who may not have a sufficient volume of logging business individually to justify individual ownership of transportation equipment. This same plan has wide application to other businesses; that is, a trucking delivery service can be rendered within a given area including groceries, or dry goods, in bulk. The trucking contractor would handle interchangeable bodies, that is, fully enclosed van-types or stakeside types. Such bodies filled with merchandise would be located on a platform or on the side of a highway convenient to the pick-up and delivery service. The pallets fully loaded can be loaded into place in the matter of minutes. Empty or fully loaded pallets are conveniently unloaded or loaded by a reversing operation of the winch 6 and cable 22 attached thereto. This system of merchandising directly results in the unique structure of the pallet which provides a convenient loading unit for material where the loading unit can be handled readily as distinguished from the impracticable efforts of attempting to handle individual logs, boxes or articles of merchandise.

Wherever in the specification and claims I have referred to a truck or truck body I desire that it be understood that this term includes any type of transportation unit such as a trailer, boat, or aircraft, or transportation unit operating on skids or runners.

I have found the method of loading and transporting material as set forth herein highly practical, economical and efficient in use, and while I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. In an apparatus for loading and transporting heavy loads by transportation unit, in combination a transportation unit body structure, a pallet frame structure including longitudinally extending tubular skids for receiving and confining a load, a pair of spaced L rails extending longitudinally of the transportation unit body structure means carried by the transportation unit body structure between said L rails for moving the loaded pallet into position thereon with said tubular skids sliding in said L rails and separate means for maintaining said loaded pallet structure in position on the transportation unit body structure between said L rails during transportation.

2. In a loading and transportation system, a transportation unit body including a pair of longitudinally extending L-shaped rails thereon, an open-work pallet having tubular skids thereon for carrying a heavy load, said skids having a width sufficient to slide between said longitudinally extending L-shaped rails, and means supported by said transportation unit body for sliding the skids of said loaded pallets in position thereon between said L-shaped rails.

3. In a loading and transportation system, a transportation unit body including a pair of longitudinally extending L-shaped rails thereon, an open-work pallet having tubular skids thereon for carrying a heavy load, said skids having a width sufficient to slide between said longitudinally extending L-shaped rails, means supported by said transportation unit body for sliding the skids of the loaded pallets in position thereon, and separate means carried by said transportation unit body for maintaining the skids of said loaded pallets in position between said L-shaped rails during transportation.

4. In a system for transporting heavy loads, the combination of a transportation unit body having longitudinally extending L-shaped rails thereon, a detachable ramp connectable with said transportation unit body in longitudinal alignment with the ends of the rails thereon, a multiplicity of U-shaped racks having a width engageable between the said L-shaped rails and ramp, whereby the racks when loaded are slidable up said ramp and onto the L-shaped rails on said transportation unit body, means carried by the transportation unit body between said L-shaped rails engaging the said racks for sliding the racks when loaded into position between said L-shaped rails, and means located between said L-shaped rails for maintaining the loaded racks on the transportation unit body.

5. In a system for transporting heavy loads, the combination of a transportation unit body having longitudinally extending rails thereon, a detachable ramp connectable with said transportation unit body in longitudinal alignment with the ends of the rails thereon and a multiplicity of U-shaped racks having a width engageable between the said rails and ramp, whereby the racks when loaded are slidable up said ramp and onto the rails on said transportation unit body, means carried by the transportation unit body engaging the said racks for sliding the racks when loaded into position thereon, coacting tongues projecting in each of said racks, a hold-down bracket engageable with the coacting tongues of adjacent racks, and means controlled by said aforementioned means for maintaining said hold-down bracket in engagement with the adjacent racks.

6. In an apparatus for carrying and transporting heavy loads, a pallet comprising a pair of tubular end frame members of substantially U-shaped contour having vertically extending tubular end portions and a substantially horizontally extending base portion, transverse members interconnecting said U-shaped end members adjacent the base thereof, a longitudinally extending T-shaped rail supported by each of said end members and extending between the vertically projecting tubular portions adjacent the base thereof, the flat tops of said T-shaped rails being operative to receive the load carried by said pallet and the rail of said T-shaped rails extending in contacting relation to the substantially horizontally extending base portion of said end members.

7. In a transportation unit for transporting heavy loads, a transportation unit chassis, a transversely extending frame member adjacent the end of said chassis, a pair of latch members pivotally mounted in spaced positions in coplanar relation on said transversely extending frame member, upwardly extending projections on the ends of said pivotally mounted latching members, a compression spring connected between said upwardly extending projections, a flexible chain extending between the lower ends of said pivotally mounted latch members, a supporting foot structure pivotally mounted on said chassis and adapted to swing gravitationally from a position engaged by said latch members to a position reinforcing said transportation unit body in a fixed position above the traction surface, whereby said latch members are disengageable from said supporting member by a pulling force exerted on said chain for releasing said supporting member to an erect position for reinforcing and supporting the loading end of said chassis.

8. The method of transporting heavy logs which comprises assembling the logs transversely of an open-work frame structure, filling the open-work frame structure with the transversely disposed logs to a loaded position, sliding the loaded open-work frame structures to adjacent positions on a transportation unit body with the logs extending transversely of the transportation unit body, securing the loaded open-work frame structures in fixed positions on the transportation unit body with the logs extending transversely thereof and maintaining the loaded open-work frame structures in positions thereon during transportation with the logs extending transversely of the transportation unit body.

CHARLES E. WHITTLE.

REFERENCES CITED

The following references are of record in the file of this patent:

UNITED STATES PATENTS

| Number | Name | Date |
| --- | --- | --- |
| 431,786 | Thompson et al. | July 8, 1890 |
| 1,562,364 | Reasoner | Nov. 17, 1925 |
| 2,117,067 | Ludington | May 10, 1938 |
| 2,161,734 | Wheless | June 6, 1939 |
| 2,188,374 | Sanchez | Jan. 30, 1940 |
| 2,355,931 | Walker | Aug. 15, 1944 |
| 2,467,354 | Baldwin | Apr. 12, 1949 |